(12) United States Patent
Wlasiuk

(10) Patent No.: US 8,417,523 B2
(45) Date of Patent: Apr. 9, 2013

(54) SYSTEMS AND METHODS FOR INTERACTIVELY ACCESSING HOSTED SERVICES USING VOICE COMMUNICATIONS

(75) Inventor: Eugeniusz Wlasiuk, Gdynia (PL)

(73) Assignee: SoftHUS Sp z.o.o, Gdynia (PL)

( * ) Notice: Subject to any disclaimer, the term of this patent is extended or adjusted under 35 U.S.C. 154(b) by 1072 days.

(21) Appl. No.: 12/364,927

(22) Filed: Feb. 3, 2009

(65) Prior Publication Data
US 2010/0198595 A1    Aug. 5, 2010

(51) Int. Cl.
*G10L 15/26* (2006.01)
(52) U.S. Cl. ...................................... 704/235
(58) Field of Classification Search .................. 704/235
See application file for complete search history.

(56) References Cited

U.S. PATENT DOCUMENTS

| | | | |
|---|---|---|---|
| 6,950,793 B2* | 9/2005 | Ross et al. ........................ 704/9 |
| 7,127,402 B2* | 10/2006 | Ross et al. ..................... 704/275 |
| 7,249,018 B2* | 7/2007 | Ross et al. ..................... 704/257 |
| 7,539,619 B1* | 5/2009 | Seligman et al. ............. 704/277 |
| 7,949,529 B2* | 5/2011 | Weider et al. ................. 704/270 |
| 8,031,060 B2* | 10/2011 | Hoffberg et al. ......... 340/426.16 |
| 8,032,383 B1* | 10/2011 | Bhardwaj et al. ............. 704/275 |
| 2002/0035474 A1* | 3/2002 | Alpdemir ....................... 704/270 |
| 2004/0083092 A1* | 4/2004 | Valles ............................... 704/9 |
| 2004/0162724 A1 | 8/2004 | Hill |
| 2008/0095327 A1 | 4/2008 | Wlasiuk |

FOREIGN PATENT DOCUMENTS

| | | | |
|---|---|---|---|
| WO | WO02/49253 | * | 6/2002 |
| WO | WO0249253 | | 6/2002 |

OTHER PUBLICATIONS

International Search Report of corresponding PCT application No. PCT/IB2010/000186.

* cited by examiner

*Primary Examiner* — Michael N Opsasnick
(74) *Attorney, Agent, or Firm* — Procopio, Cory, Hargreaves & Savitch LLP; Noel C. Gillespie

(57) ABSTRACT

Systems and methods for an interactive voice response system are described herein. In one embodiment, the system may include a voice recognition module, a session manager, and a voice generator module. An utterance received at the voice recognition module may be converted into one or more structures using a lexicon tied to an ontology. Concepts in the utterance may then be identified. If sufficient information has been provided to identify a relevant service, corresponding text responses associated with that service may then be converted into voice messages by the voice generator.

6 Claims, 5 Drawing Sheets

SYSTEMS AND METHODS FOR INTERACTIVELY ACCESSING HOSTED SERVICES USING VOICE COMMUNICATIONS

BACKGROUND

1. Technical Field

The embodiments disclosed in this application generally relate to an interactive voice response system, and more particularly, systems and methods that enable voice communication access to hosted services, e.g., shops, car rentals, motels etc., via telephony.

2. Related Art

Corporations today routinely provide customer service via the Internet and the telephone for reasons of cost or expediency. Currently, users may obtain such Internet services from an access device that offers visual presentation capabilities—for example, a personal computer (PC) with an Internet web browser that requests and receives HyperText Markup Language (HTML) documents produced by a Web server. For e-commerce applications, the Web server has or provides access to service logic and transaction server interfaces that process the user's input. The service logic is programmed using any number of popular Web programming tools.

Users obtain telephone services with an access device that has audio interaction capabilities—for example, a telephone or a voice over Internet protocol (VOIP) device calling an interactive voice response (IVR) platform that has audio input, output, and telephony functions and its own service logic and transaction server interface. IVR systems are automated to allow a telephone user to access linked services on the system through verbal commands. The service logic is typically programmed in a general-purpose software language using the platform's application-programming interface (API), or a platform-specific scripting language.

Traditional interaction styles of IVR systems include menus, directed dialogs, and mixed-initiative dialogs made possible by improvements in utterance recognition technology. Menu style interactions typically use pre-recorded voice prompts asking the user to press a number on a telephone keypad or speak simple answers, e.g., "yes," "no," or simple numbers, to select an item from a set of choices. In directed dialogs, the system leads the user through a collection of data by asking discrete questions that require discrete answers. For example, to find out where a person resides, a discrete dialog system would first ask for the person to name the state he lives in followed by asking for the city. Mixed-initiative dialog systems let the user enter multiple pieces of data in a single utterance and provide partial information.

Despite these advances, conventional IVRs still tend to be slow, impersonal, and offer a cumbersome platform for assisting interactions between the system and the user. Maneuvering through a maze of menu options and choices on the phone tends to be very time consuming and the voice command recognition/understanding features of directed and mixed-initiative dialog systems are not designed to effectively handle voice commands that are not responsive to scripted questions. In short, none of the existing IVRs allow for true interactive handling of services by users.

SUMMARY

Methods and systems for interactively accessing hosted services using voice communications are disclosed herein.

In one aspect, in a system comprising a voice recognition module, a session manager, and a voice generator module, a method for providing a service to a user comprises receiving an utterance via the voice recognition module; converting the utterance into one or more structures using lexicon tied to an ontology; identifying concepts in the utterance using the structures; provided the utterance includes sufficient information, selecting a service based on the concepts; generating a text message based on the selected service; and converting the text message to a voice message using the voice generator.

In another aspect, a system comprising for providing a service to a user comprises a voice recognition module configured to receive an utterance and convert the utterance into text; one or more structures using lexicon tied to an ontology; a session manger configured coupled with the voice recognition module and configured to generate a structure associated with the text using lexicon tied to an ontology, identify concepts in the utterance using the structure; provided the utterance includes sufficient information, select a service based on the concepts, and generate a reply text message based on the selected service; and a voice generator module coupled with the session manager and configured to convert the reply text message to a voice message.

These and other features, aspects, and embodiments of the invention are described below in the section entitled "Detailed Description."

BRIEF DESCRIPTION OF THE DRAWINGS

For a more complete understanding of the principles disclosed herein, and the advantages thereof, reference is now made to the following descriptions taken in conjunction with the accompanying drawings, in which.

DETAILED DESCRIPTION

Methods and systems for interactively accessing hosted services using voice communications as described below. It will be understood, however, that the systems and methods described herein can be practiced without some or all of these specific details. In other instances, well known process operations have not been described in detail for the sake of brevity.

As used herein, telephony is the general use of equipment, e.g., land line phones, mobile phones, Internet communications devices, etc., to provide voice communication over distances. Telephony encompasses traditional analog phone systems that transmit voice communications via analog type signals, i.e., continuous in time and amplitude, and more recent digital phone systems that transmit voice communications via digital type signals (i.e., discrete binary). Voice over Internet Protocol (VOIP) is a modern form of digital-based telephony that uses Transmission Control Protocol/Internet Protocol (TCP/IP) and other network transmission formats for transmitting digitized voice data through the Internet.

The Internet or World Wide Web (WWW) is a wide area network (WAN) made up of many servers linked together allowing data to be transmitted from one server to another using network data transmission protocols such as TCP/IP, Reliable User Datagram Protocol (RUDP), or their equivalents. Typically, the Internet links together a multitude of servers that are located in a wide geographical area. In contrast, local area networks (LAN) are smaller networks of servers such as those covering a small local area, such as a home, office, or college.

In view of the foregoing, it should be appreciated that an IVR system can benefit from the systems and methods, described herein, for interactively using voice communications to determine which services are requested by customers and delivering those services to them without using menu-driven or pre-scripted dialogs.

Figure 1:
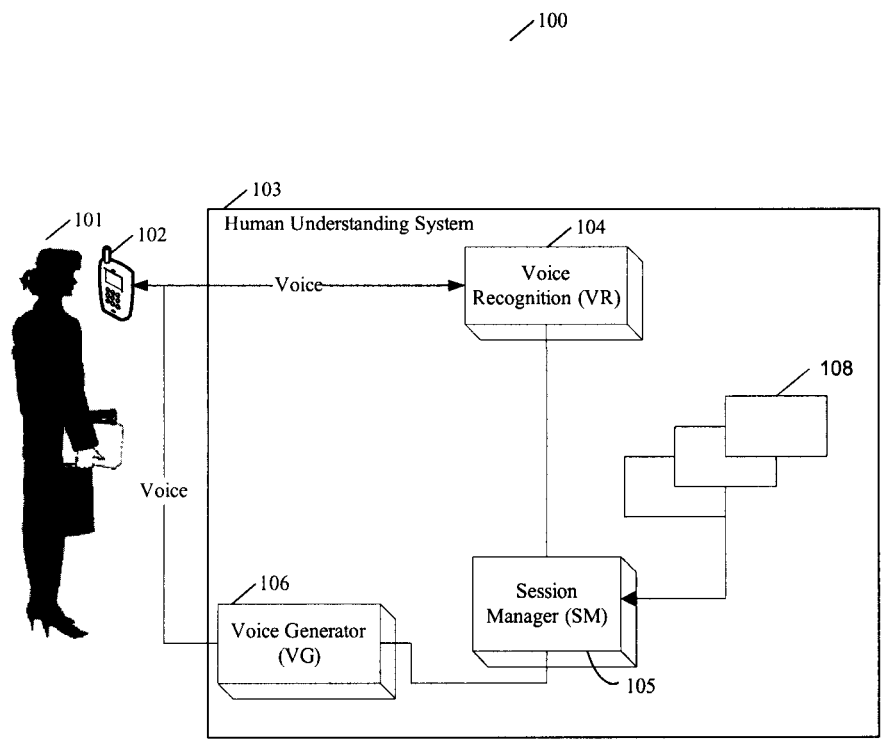
FIG. 1 is a diagram illustrating the functional elements of an Interactive Voice Response (IVR) system that permits a user to interactively access hosted services using voice communications, in accordance with one embodiment.

FIG. 1 is a diagram illustrating the functional elements of an Interactive Voice Response (IVR) system that permits a user to interactively access hosted services using voice communication, in accordance with one embodiment. As depicted herein, the system handles a user 101 operating a telephony device 102 that is configured to be in communications with a Human Understanding System 103, which contains various hosted services 108. In order to be accessed via the Human Understanding System 103, each service 106 must be first defined in this system.

Thus, system 100 can be configured to handle a plurality of services 108 and provide them to the user 101 through the Human Understanding System 103. During exemplary registration process, the following elements for each service should be provided: the geographic regions where the service is available, a detailed description of the service in a natural language, a list of required data from the user 101 in order for the service to be provided to the user 101, and a conversation script.

In one embodiment, each registered hosted service is related to one or more groups of service provider, e.g., shops, car rentals, motels. It should be understood that many aspects of human life can be served by appropriate hosted services as long as these services can be ordered by the user 101 via a telephony device 102.

In one embodiment, the telephony device 102 can be communicatively linked with the Human Understanding System 103 via an analog land line, e.g., analog physical wire connection, configured to transmit voice data using analog signals. In another embodiment, the telephony device 102 can be communicatively linked with the Human Understanding System 103 via a digital land line, e.g., digital fiber optic connection, configured to transmit voice data using discrete digital binary signals.

In yet another embodiment, the telephony device 102, e.g., mobile phone, satellite phone, can be communicatively linked with the Human Understanding System 103 via a wireless communications link that is configured to transmit voice data to the Human Understanding System 103 using either radio frequency (RF) or microwave signals. The transmission format can be either analog or digital and the wireless communications link can be either a direct link with the Human Understanding System 103 or through a base unit that is connected to the Human Understanding System 103 through a land line or another wireless connection. In still another embodiment, the telephony device 102, i.e., Internet communications device, can be communicatively linked, through either a landline, a wireless connection, or both, with the Human Understanding System 103 by way of a network connection that is configured to transmit voice data using Voice Over Internet Protocol (VOIP) or equivalent protocol. The network connection can be distributed as a localized network, i.e., local area network, or a wide area network, i.e., the Internet.

In one embodiment, the system can be configured to operate via a user 101 operating a mobile phone, i.e., telephony device 102, to place a call into the Human Understanding System 103 to access a service that is offered by the Human Understanding System 103. The mobile phone 102 communicates by way of a RF link with a mobile phone provider, i.e., cellular network provider, which is itself linked to a Public Switched Telephone Network (PSTN), i.e., land line, in communication with the Human Understanding System 103. The Human Understanding System 103 can in turn be communicatively linked with multiple domain systems via the Internet or a LAN. In another scenario, a user 101 can operate a VOIP enabled computer, i.e., telephony device 102, to place a VOIP call to a Human Understanding System 103 that is linked to the Internet. The VOIP-enabled computer communicates via a broadband Internet connection that is communicatively linked to the Human Understanding System 103 through a network connection, e.g., the Internet, LAN, etc.

It should be appreciated that the scenarios provided above have been included for illustrative purposes only and are not intended to limit the communication configurations available for system 100 in any way. There are a multitude of conceivable approaches in which to set up the communications between the user 101 and the Human Understanding System 103; limited only by the ability of the resulting systems to transmit voice data to the Human Understanding System 103 with sufficient clarity and specificity to allow the Human Understanding System 103 to process and understand the voice data.

Continuing with FIG. 1, the Human Understanding System 103 includes the following: a Voice Recognition Module 104, a Voice Generator Module 106, and a Session Manager module 105. The Voice Recognition Module 104 can be configured to receive utterance from a user 101 via a telephony device 102 that is communicatively linked to the Human Understanding System 103, e.g., using any of the telephony communication configurations described above. In certain embodiments, the utterance includes information about the user 101, e.g., identification information, authentication information, as well as information about the offered services that the user 101 is requesting access to. The Voice Recognition Module 104 can be configured to translate the voice data received from the user 101 into text data and transfer that data to the Session Manager module 105.

It will be understood that Human Understanding System 103 can comprise the components, both hardware and software, required to carry out the functions described herein. It will be further understood that the Human Understanding System 103 can comprise other components and functionality, and that certain functions can be carried out by the same or different components. Accordingly, FIG. 1 should not be seen as limiting the systems and methods described herein to a certain architecture or configuration. Rather, FIG. 1 is presented by way of example only.

In one embodiment, the Voice Recognition Module 104 is configured to recognize the 30 most common languages of the world. Some examples of languages that the Voice Recognition Module can recognize are: English, Chinese, Hindi, Spanish, Bengali, Portuguese, Russian, German, Japanese, and French. In another embodiment, the Voice Recognition Module 104 is configured to recognize only the languages specified by the services that are handled by the Human Understanding System 103. It should be understood, however, that the Voice Recognition Module 104 can be configured by the system administrator to recognize any language as long as the linguistic characteristics of the language avail the language to be converted via computer processing. Voice Recognition Module 104 can be further configured to convert the voice of user 101, provided via device 102, into text.

The Session Manager Module 105 can be configured to operate in two states: 1) the "Choosing Service State" in which the Session Manage Module 105 is configured to choose the service 106; and 2) the "Conversation Script State" in which the Session Manage Module 105 is configured to execute conversation script 203 appropriate to the chosen service 106.

The Session Manager Module 105 is equipped with set of lexicons, for particular natural languages, connected with ontology. This enables it to convert the text of natural speech into special structures containing grammatical and ontological information. This ontological information can be used to determine which service 106 is required and can also be used in the "Conversation Script State," e.g., to make inquiries as to whether certain concepts were in fact communicated by user 101.

When Session Manager 105 is working in the "Choosing Service State," it can be configured to implement the following process: Choose the services 108 which have defined ontological concepts closest to ontological concepts occurring in customer utterance and at the same time exclude services 108 where ontological conditions defined for this service are in conflict with this customer utterance. When the information is not sufficient for the Session Manager 105 to determine the identity of the service 106 requested, the Session Manager 105 can be configured to generate an appropriate text to query the user 101 for the necessary information required to make that determination. The Session Manager 105 then forwards the text to a Voice Generator Module 106 configured to convert the text into an utterance, which the Voice Generator Module 106 communicates to the telephony device 102 for the user 101 to listen to.

In one embodiment, this process can be repeated by the Session Manager 105 as often as necessary until the Session Manager 105 has received sufficient information to determine the identity of the service 108 requested in the voice data presented by the user 101. In another embodiment, the system administrator can enable or implement special services, e.g., service-to-choose services, with appropriate conversation scripts 203, which can ask the customer about more information and choose particular service 108. Conversation scripts 203 can call other services in certain embodiments. For example, in a rental car application, a special service configured to chose an appropriate rental car company based on the state, city, type of car, etc., can be called in order to complete the service.

It should be appreciated, that the various embodiments discussed above are configured to effectuate highly interactive dialog between the user 101 and the Human Understanding System 103. The intention is to mimic, as closely as possible, the communications environment between the user 101 and handled services 108 including trying to determine which service 108 or other information is being requested by the user 101. As opposed to conventional system in which a series of menu options must be selected and or a series of information requests are responded to, wherein selection and requests for responses follow a fixed relatively linear progression through a predetermined decision tree. These conventional interactions do not at all resemble a natural conversation between two humans.

As in the case of the Voice Recognition Module 104 described above, in one embodiment, the Voice Generator Module 106 can be configured only to enable conversion of the 30 most common world languages. In another embodiment, the Voice Generator Module 106 can be configured to recognize only the languages specified by the services that are handled to the Human Understanding System 103. It should be appreciated, however, that the Voice Generator Module 106 can be configured by the system administrator to recognize any language as long as the linguistic characteristics of the language avail the language to be converted via computer processing.

Once the Session Manager 105 has successfully identified the service 108 requested by the user, the Session Manager 105 starts to execute conversation script defined for this service.

Figure 2:
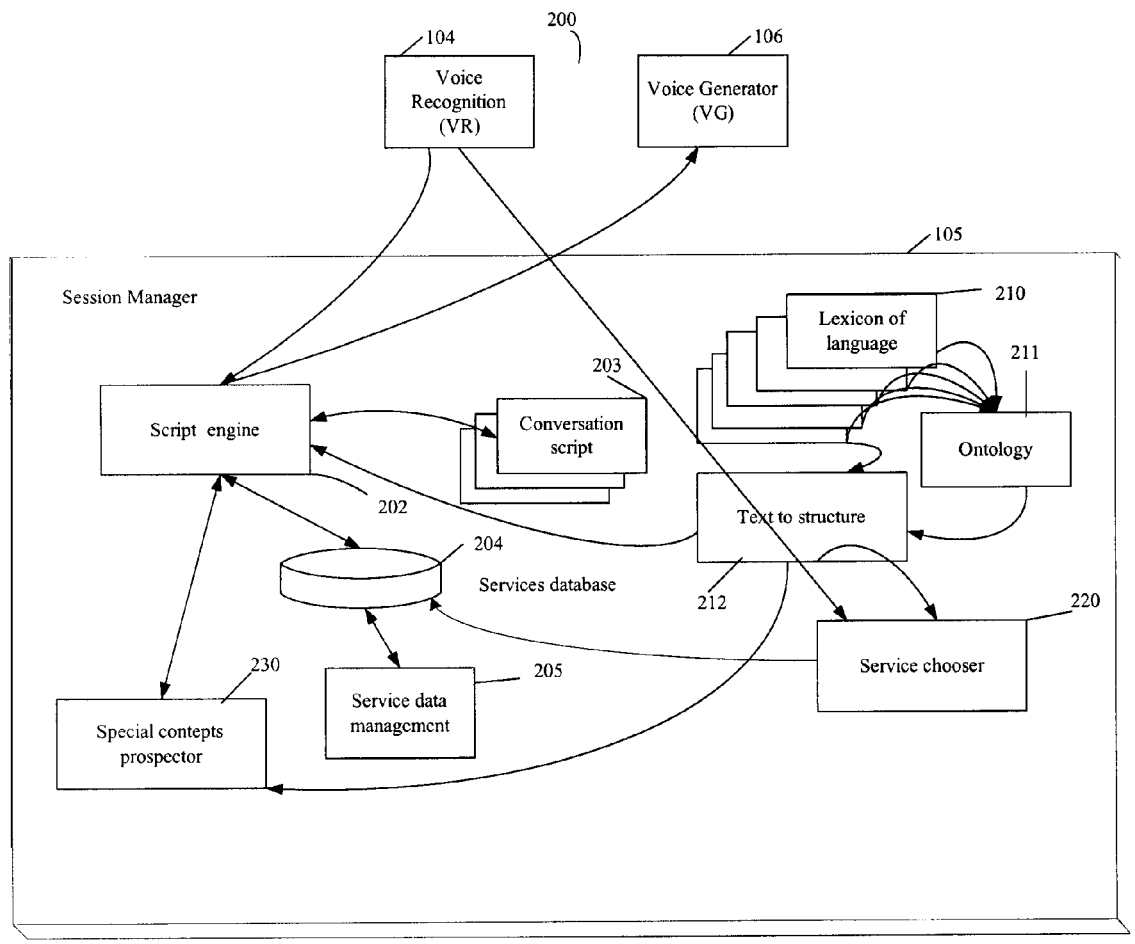
FIG. 2 is a detailed illustration of the internal components of the Session Manager that can be included in the system depicted in FIG. 1 and how those components interact with the rest of the modules in the Human Understanding System, in accordance with one embodiment.

FIG. 2 is a detailed illustration of the internal components of the Session Manager 105 and how those components interact with the rest of the modules in the Human Understanding System 103, in accordance with one embodiment. As shown in this embodiment, the Session Manager 105 includes a Script Engine 202, the Conversation Scripts 203 defined for all services 108, a Services Database 204, and a Service Data Management component 205.

The Session Manager also includes Text-to-Structure module 212, which can transform text of human utterance into special structures using appropriate Lexicon 210. These Lexicons 210 are linked with Ontology 211. This association allows the Text-to-Structure module 212 to convert text in any defined human language into structure containing grammatical and ontological information, independent of human language.

Session Manager 105 can also include a Special Concepts Prospector 230. To understand Special Concepts Prospector 230, it is necessary to explain what these special concepts are. They are concepts which do not need to be understood, e.g. names, colors, addresses. Rather, what is of interest is a value or rank that can be associated with the concept. Such concept have a number of patterns, in all natural languages, that allow humans to talk about them. Accordingly, the Special Concepts Prospector 230 is analyzing text and structures produced from utterance to extract special concept values. Additionally, there can be defined sets of questions, in appropriate languages, designed to produce information from user 101 that can further clarify the concept associated with the value.

When the Script Engine 202 encounters a request for a special concept in Conversation Script 203, it calls Special Concepts Prospector 230 to get a value associated with the concept. In case of lack of this information, Special Concepts Prospector 230 returns to Script Engine 202 appropriate questions which can be forwarded to customer 101 via Voice Generator Module 106. After receiving an answer, the process can be repeated if necessary. If the customer refuses to provide an answer, the Script Engine 202 will write down this fact to make it possible for the script to react. Special concepts and their use are described in more detail below.

Special instructions can be embedded in the conversation script 203 to make a query to an appropriate database. Other instructions can be embedded in the conversation scripts 203 associated with services 108 to allow the results to be presented to the customer in order to enable him to choose a specific value. Yet other instructions can be used to update the database 204 with appropriate data.

Conditional instructions in the conversation scripts 203 make it possible to react to anticipated human reactions. These conditional instructions can include instructions such as if, switch, while, etc., instructions that can enable system 103, or more specifically Conversational Scripts 203 to deal with various scenarios such as what to do if user 101 refuses to provide an answer or certain information.

The conversation scripts 203 can be configured to operate on message numbers, which can be converted to messages in natural language depending on language used by the customer.

Figure 3:
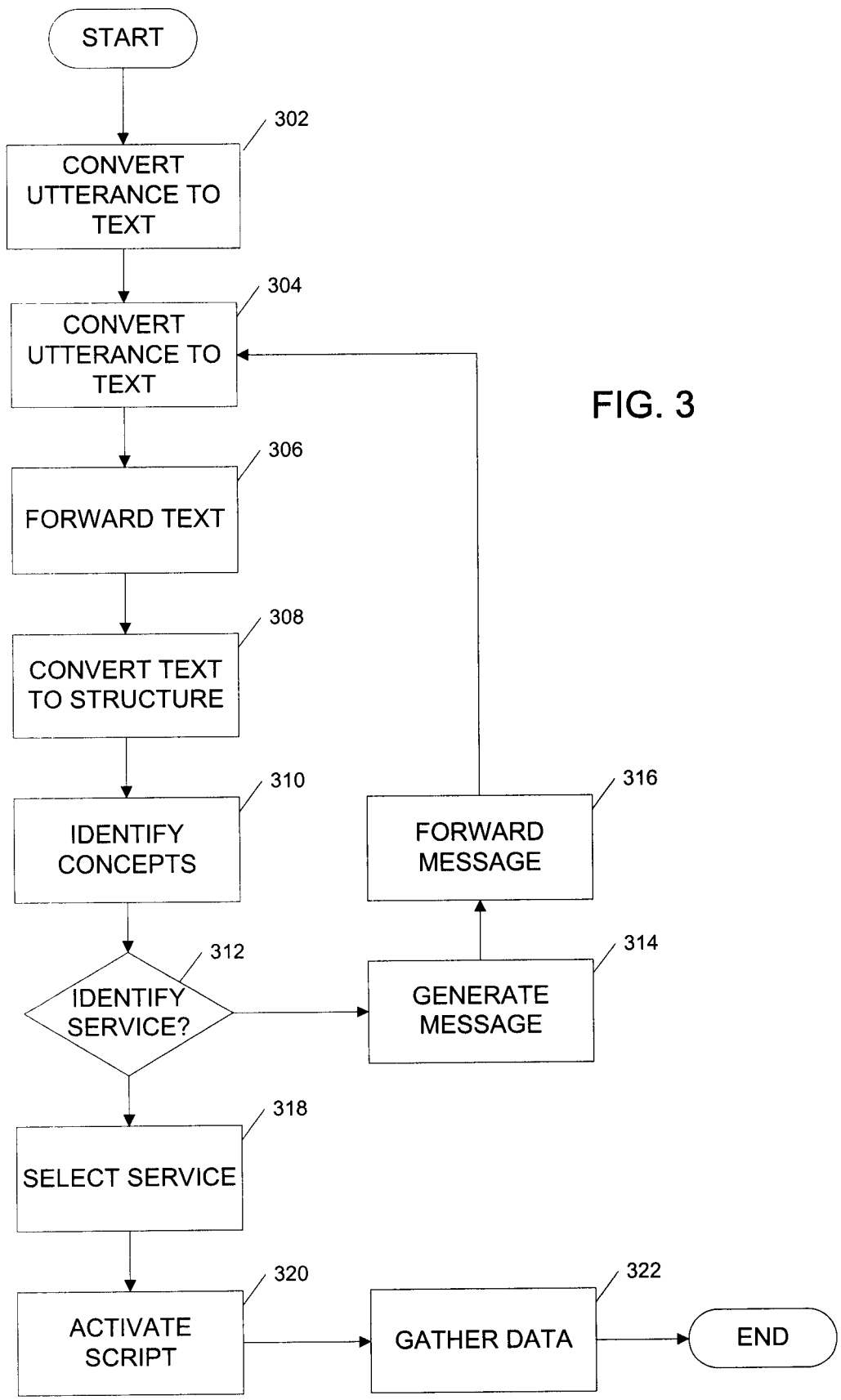
FIG. 3 is a flow chart illustrating the operation of the system illustrated in FIGS. 2 and 3 in accordance with one embodiment.

FIG. 3 is a flow chart illustrating an example process whereby system 100 is used to select and provide a service 108 (the "Selective Service State') to a user 101 in more detail and in accordance with one embodiment. In step 302, voice recognition engine 104 can receive a voice utterance from user 101 via device 102, and the associated communications infrastructure. As noted, the utterance can include information such as identification information, i.e., a name, number, address, etc.; authentication information, i.e., social security number, confirmation number, etc.; information about the desired service, i.e., sales, customer service, reservations, etc.; to name just a few examples of the type of information that can be included in the utterances received from a user 101.

In step 304, the voice recognition module can be configured to translate or convert the utterances into text that can be forwarded to Session Manager 105 in step 306.

Session Manager 105 can then convert the text to structures in step 308 using lexicon linked with ontology. In step 310, Session Manage 105 can use the structures to identify concepts included in the utterances, i.e., the ontological concepts included in the utterances. The concepts can then be used in step 312 to identify the service 108 being requested. Concepts and their identification within system 103 are described in more detail below.

When not enough information is present in the utterances to sufficiently identify a service 108, then the Session Manager can be configured to generate in step 314, text massages design to elicit further information to allow the identification of a service 108. The text messages can be generated using the Conversation Scripts 203 and can be sent to Voice Generator 106, in step 316, which can be configured to convert the text messages into speech to be communicated to the user 101 via device 102.

The process will then repeat until enough information is present to select a service in step 318. One the service is selected, the appropriate Conversation Scripts 203 can be activated, in step 320, in order to generate text messages that can be forward to Voice Generator 106, in step 322, in order to communicate with user 101.

Figure 4:
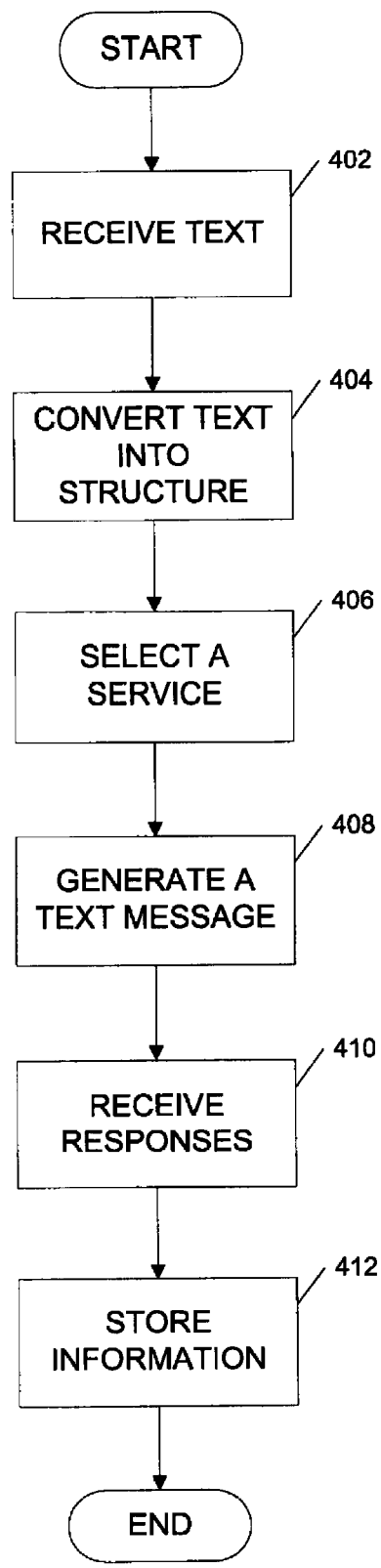
FIG. 4 is a flow chart illustrating the operation of the system illustrated in FIGS. 2 and 3 in even more detail and in accordance with one embodiment.

FIG. 4 is a flow chart illustrating the process of selecting a service undertaken by Session Manager 105 in more detail and in accordance with one embodiment. In step 402, Script Engine 202 receives the text information from Voice Recognition module 104 and sends the text to Text-to-Structure engine 212, which can be configured to convert the text into structures in step 404 using an appropriate lexicon 210 and associated ontology 211. The structures can then be used, in step 406, by Service Chooser 220 to select a service from Service Database 204.

In Step 408, the selected service can then cause script engine 202 to generate the appropriate text messages, using Conversation Scripts 203, needed to provide the appropriate information to, or solicit information from user 101. In other words, Script Engine 202 in concert with Conversation Scripts 203 allow system 103 to communicate in a natural manner with user 101 as dictated by the selected service.

The Service Data Manager 205 can be configured to store data associated with the various services in Service Database 204. In addition, Service Database 205 can be configured to store information received from user 101 as well as, e.g., Special Concepts Processor 230. Thus, as messages are generated in step 408, new information is received in response thereto in step 410. In step 412, information or values associated with the information received in step 410 can be stored in service database 412.

Figure 5:
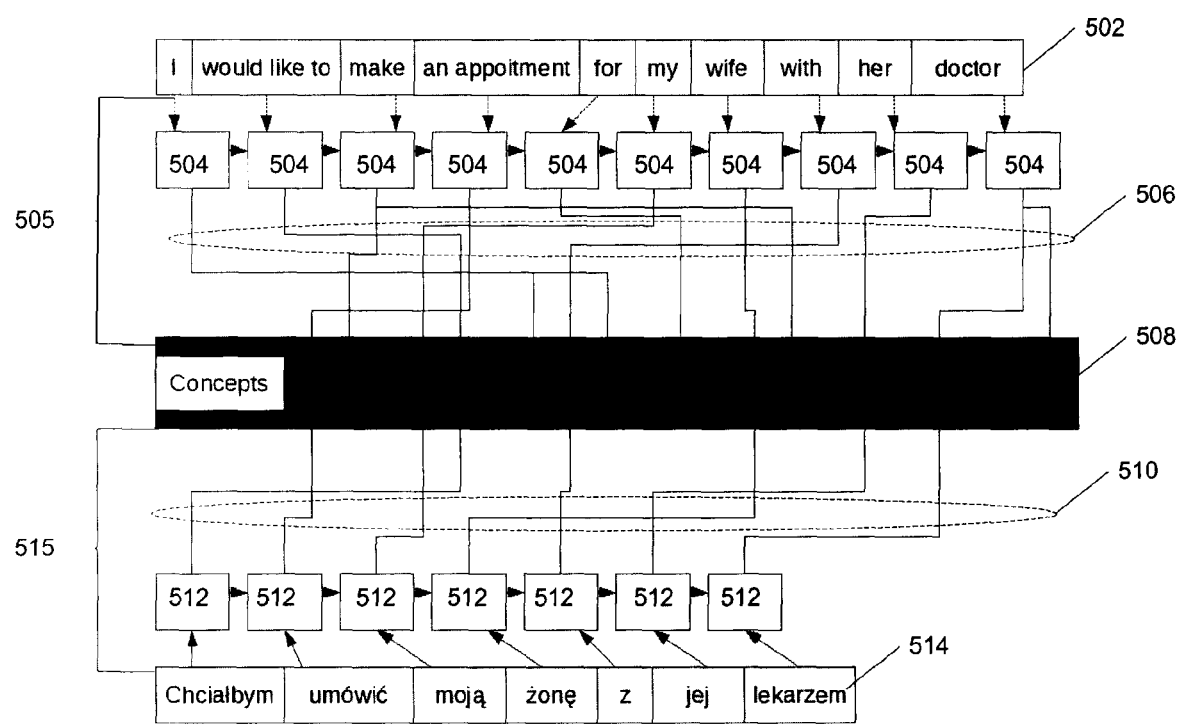
FIG. 5 is a diagram illustrating the generation of structures for example utterances that can take place in the session manager of FIGS. 1 and 2 in accordance with one embodiment.

FIG. 5 is a diagram illustrating an example for forming structures and linking them to concepts in accordance with on embodiment. FIG. 5 illustrates the process for the following utterance: "I would like to make an appointment for my wife with her doctor;" and the equivalent in Polish "Chciał bym umówić moją żonę z jej lekarzem." Each utterance 502 (English) and 514 (Polish) includes a plurality of lexems as defined by the associated lexicon 210 for that language. In general, each lexemes in the lexicon 210 of each language is connected directly or via a root lexeme, in languages with flexion, to an appropriate concept or concepts 508. Each concept 508 is connected to a plurality of lexemes in each lexicon 210, because in natural language communication, there are many synonyms and different ways of communicating the same concept.

Still referring to FIG. 5, utterances 502 and 514 can be converted to a unit 504 or 512. Each unit 504 and 512 can correspond to one or more lexemes in an utterance. For example, a unit 504 can correspond to a single lexeme, or can have multiple sub-units such that it can correspond to multiple lexemes, such as the grouping "would like to" in utterance 502 in the example of FIG. 5. Each unit 504, or sub-unit, can then be linked via links 506 and 510 to one or more concepts 508 based on the associated ontology 211.

The combination of units 504 and 512 and links 506 and 510 respectively, form the structures 505 and 515 associated with the various concepts 508. It should be noted that each concept 508 will have a unique structure regardless of the lexemes included in the input utterance that points to, or leads to the concept being identified. In other words, if utterance 502 was stated slightly different, i.e., "I would like to make a doctors appointment for my wife," or "I would like to see if my wife's doctor is available," very similar structures 505 and 515 should be generated that would lead to the identification of the same concepts 508.

Thus, each service 108 defined in system 103 can have a set of concepts 508 associated with it. In many embodiments, only significant concepts are included in to avoid unnecessary associations. Also, in other embodiments, lexemes that only communicate grammar are omitted. Optionally each service can also have excluding and required conditions. For example, certain information must be present for certain service 108 to be selected, whereas other information cannot be included if a certain service 108 is to be selected.

The concepts 508 can then be associated with the services 108. In other words, each service will have certain concepts associated with it. Session Manger 105 can then determine the structure, e.g., structure 505, associated with an utterance, e.g., utterance 502, and determine what services 108 are most closely associated with the structure 505, i.e., have the most concepts 508 associated with the utterance 502 based on the structure 505. In certain embodiments, Session Manager 105 can also be configured to determine whether any required conditions and excluding conditions have been met for each service 108 in determining which service 108 is most closely associated with the utterance 502.

Once a service 108 is selected, then the next step can be to gather data for the service using the Conversation Scripts 203. This can involve special concepts as described above. Again, special concepts are concepts system 103 is not really trying to understand, but for which system 103 is trying to generate an associated value rank. In the example of FIG. 5, such concepts can be: Person, i.e., who is going to the doctor; Time, i.e., when the appointment should be made; and Doctor, which doctor is needed.

First, the utterance, e.g., utterance 502, can be evaluated to determine whether it includes the necessary data. The value, or rank is an indication of how strongly the data provided corresponds to this information. The task of determining whether the data is included and providing a value or rank can fall to Special Concepts Processor 230. If it appears that the utterance 502 does not include the needed data, then Script Engine 202, under the control of the selected service 108, can select Conversation Scripts designed to elicit the information. In the above example, the customer will be asked (in talk script) about the date of the appointment, because only this information has not specified when ordering the service.

Once the values generated indicate that all the needed information is present, then the data can be stored and used to make the appointment. Conversation Scripts 204 can then be used to generate a message confirming the appointment that can be communicated to the user.

Again, Conversation Scripts 203 generate and respond to received utterances in a natural manner using natural language. Thus, user 101 should fell as though they are having a normal conversation as they are prompted for an provide the needed information.

All or parts of the systems and methods described herein can also be embodied as computer-readable code on a computer-readable medium. The computer-readable medium is any data storage device that can store data, which can thereafter be read by a computer system. Examples of the computer-readable medium include hard drives, network attached storage (NAS), read-only memory, random-access memory, CD-ROMs, CD-Rs, CD-RWs, magnetic tapes, and other optical and non-optical data storage devices. The computer-readable medium can also be distributed over a network-coupled computer systems so that the computer-readable code is stored and executed in a distributed fashion.

Although a few embodiments have been described in detail herein, it should be understood, by those of ordinary skill, that the systems and methods described herein may be embodied in many other specific forms. Therefore, the present examples and embodiments are to be considered as illustrative and not restrictive, and the systems and methods described herein are not to be limited to the details provided herein, but may be modified and practiced within the scope of the appended claims.

What is claimed is:

1. In a system comprising a voice recognition module, a session manager, and a voice generator module, a method for providing a service to a user comprising:
   receiving an utterance via the voice recognition module;
   converting the utterance into one or more structures using lexicon tied to an ontology;
   identifying concepts in the utterance using the structures;
   provided the utterance includes sufficient information, selecting a service based on the concepts;
   generating a text message based on the selected service;
   converting the text message to a voice message using the voice generator;
   identifying special concepts associated the selected service and assigning a value to the identified special concepts based on information included in the utterance;
   determining if all special concepts associated with the selected service are present in the utterance, and if not, then generating a text message designed to elicit information related to any missing special concepts and converting the text message to a voice message using the voice generator.

2. The method of claim 1, further comprising when all special concepts are present and assigned a value, then performing or completing the service.

3. The method of claim 2, wherein performing the service comprises storing the information included in the utterance and associated with the special concepts.

4. A system comprising for providing a service to a user comprising:
   a voice recognition module configured to receive an utterance and convert the utterance into text;
   a session manger configured coupled with the voice recognition module and configured to:
      generate a structure associated with the text using lexicon tied to an ontology,
      identify concepts in the utterance using the structure;
      provided the utterance includes sufficient information, select a service based on the concepts, and
      generating a reply text message based on the selected service; and
   a voice generator module coupled with the session manager and configured to convert the reply text message to a voice message;
   wherein the session manager is further configured to identify special concepts associated the selected service and assign a value to the identified special concepts based on information included in the utterance, and is further configured to determine if all special concepts associated with the selected service are present in the utterance, and if not, then generate a text message designed to elicit information related to any missing special concepts, the voice generator module being further configured to convert the text message to a voice message using the voice generator.

5. The system of claim 4, wherein the session manger is further configured, when all special concepts are present and assigned a value, to perform or complete the service.

6. The system of claim 5, wherein the session manger is further configured to perform the service by storing the information included in the utterance and associated with the special concepts.

* * * * *